W. GOODROW.
MITER JOINT FASTENER.
APPLICATION FILED APR. 14, 1913.
1,089,360.
Patented Mar. 3, 1914.
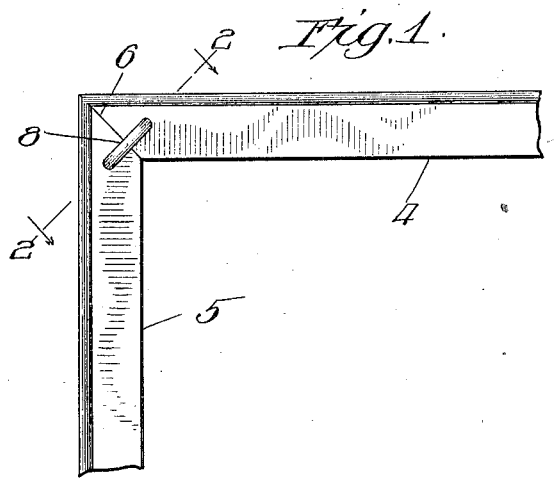
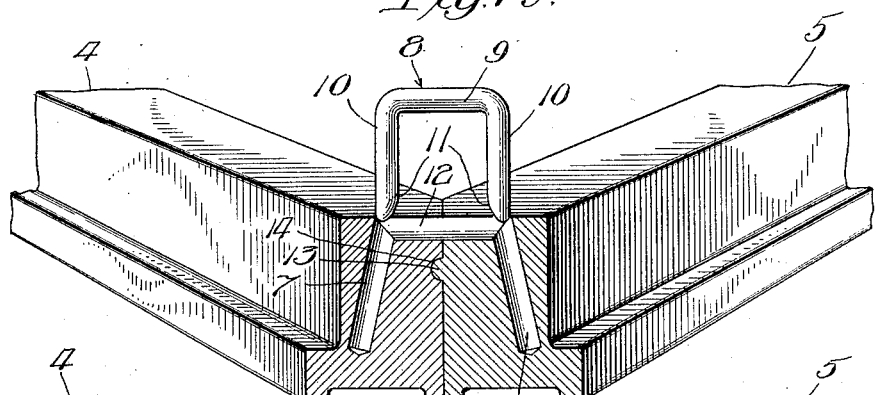
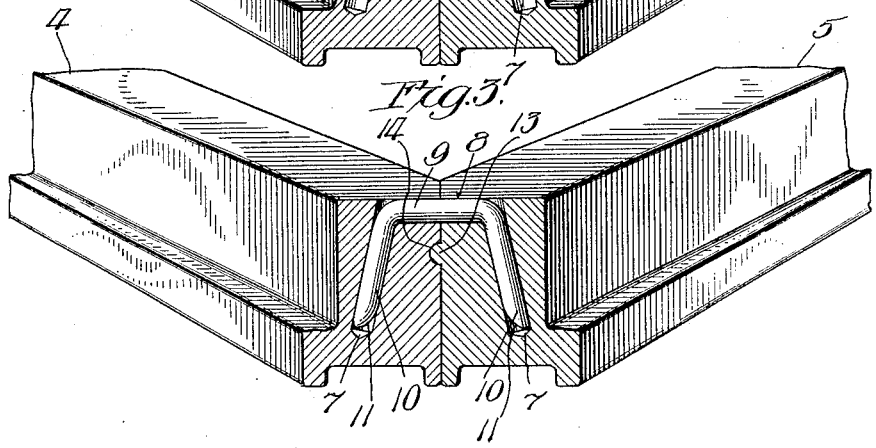
Witnesses:
Harry S. Gaither
Albert Bettcher
Inventor:
William Goodrow
by Banning & Banning
Attys

UNITED STATES PATENT OFFICE.

WILLIAM GOODROW, OF CHICAGO, ILLINOIS.

MITER-JOINT FASTENER.

1,089,360.   Specification of Letters Patent.   Patented Mar. 3, 1914.

Application filed April 14, 1913.   Serial No. 761,111.

*To all whom it may concern:*

Be it known that I, WILLIAM GOODROW, a citizen of the United States, residing at Chicago, in the county of Cook and State of Illinois, have invented certain new and useful Improvements in Miter-Joint Fasteners, of which the following is a specification.

The present invention relates more particularly to a means for fastening together strips of wood or other material having their abutting edges cut upon a slant to produce a miter joint, and is particularly useful in fastening together the strips of molding comprising a picture frame.

The objects of the present invention are: to provide a fastener and arrange the bores or openings formed in the wood which receive the fastener, in a manner so as to enable the same to be utilized with moldings of a narrow character; to provide a fastener which will be easy of insertion; to arrange the bores or openings into which the fastener is inserted so that an undue weakening of the wood or other material at the point where the fastener is inserted will be eliminated; to arrange the bores or openings so that the fastener will be placed under a spring tension when inserted, whereby the sections to be united will be drawn into close contact with one another; to form the bores or openings into which the fastener is inserted of practically the same diameter as the diameter of the legs of the fastener so that no relative movement is permitted between the fastener and the strips to be united; and to so arrange the bores which receive the legs of the fastener as to have engagements between said legs and the walls of the bore for the entire length of the bore.

The invention further consists in the features of construction and combination of parts hereinafter described and claimed.

In the drawings: Figure 1 is a rear view of a frame corner locked together by the fastening means of the present invention; Fig. 2 is a cross section on line 2—2 of Fig. 1 looking in the direction of the arrow, showing the molding strips in perspective, and showing the locking member about to be inserted in position; and Fig. 3 a view similar to Fig. 2, showing the locking member fully inserted.

Referring now to the drawings, and particularly to Fig. 1, an upper strip or section 4 and a side strip or section 5 of a frame is illustrated, each of the sections being beveled at one end as at 6 to produce a miter joint. Each of the strips or sections is provided with a bore or hole 7 which extends downwardly in the body of the strip and in a diagonal direction extending outwardly from the point of juncture of the strips from the upper to the lower ends of the bores. It will be noted that the bores do not extend clear through the molding but extend from the back a distance of approximately three quarters of the transverse dimension of the molding, although the particular depth may be varied in accordance with the ideas of the molding manufacturer.

By referring to Figs. 2 and 3, it will be seen that these bores 7 diverge from one another from their upper to their lower ends. By this arrangement several very important features are accomplished. In the first place, by reason of the divergent relation above referred to, the distance between the walls of the bores and the abutting faces of the molding is increased from the upper to the lower end of the bore; that is, the distance is greater at the lower than at the upper end. The point of greatest pressure is at the lower end of the bore, so that the danger of the fastening member crushing the wall between the bore and the beveled face of the strip is eliminated, by increasing the amount of material at the lower end of the bore. As shown in the drawing, the degree of slant of the bore is greater than would be the case in actual practice, only a sufficient diverge being produced to create a spring tension in the fastening member.

The fastening member consists of a U-shaped piece 8 consisting of a horizontal top bar 9 and vertical depending legs 10, said legs being arranged at approximately right angles to the bar. The legs are spaced apart from one another a distance equal to the distance which the upper ends of the bores 7 are spaced apart when the molding is joined together in the frame structure, and the lower end of the legs 10 may be slightly rounded, as at 11, to insure the easy insertion of the same into the upper portions of the bore 7. By this arrangement no spreading or compressing of the legs of the fastening member is necessary, in order to insert the same within the bores 7, and the diameter of the bores can be made equal to the diameter of the legs 10, or approximately equal, only sufficient difference need exist to enable the legs to have a sliding fit within the bores.

Owing to the divergent relation of the bores 7, when the fastening member is inserted in position, as in Fig. 3, the legs will be spread apart, and owing to the fact that the fastening member is formed of spring material, a spring tension will be generated. The tendency of the lower ends of the legs is to come together; so that the force of the tension created in each leg will tend to bring together the abutting edges of the joined strips, and will produce the firm compact engagement at this point which is necessary and essential to the production of a frame of good appearance.

By reason of the fact that the legs of the fastening member are approximately the same diameter as the bores, an engagement between said legs and the walls of the bore will be maintained throughout the length of the bore, thus giving a multitude of points of pressure so that a firm engagement at the abutting edges of the strips is maintained, and by using a bore of equal size to the legs of the fastening member a small bore can be used when moldings of narrow width are to be joined, thus eliminating any undue weakening of the same by reason of a large bore being necessary. The spring pressure created in the locking member will serve to impinge or press the same against the walls of the bore, creating a friction engagement therebetween which will prevent the locking member from springing out of position.

A cross groove 12, as shown more clearly in Fig. 2, may be provided, in which the upper bar 9 of the fastening member will rest when said locking member is inserted, to bring said locking member flush with the back portion of the frame and preventing endwise slippage between the parts when assembled. One of the sections is preferably provided with a tongue 13 and the other with a groove 14 to receive said tongue. This tongue and groove is not intended as a locking feature, but is of a relatively small nature and is merely used for the purpose of centering and alining the front and rear faces of the molding, when the same is placed in position to form the frame.

The fastening member can be inserted without the use of any tool if desired; it being adapted to be readily forced into place manually by the dealer or user.

I claim:

The combination of companion strips having abutting faces cut upon a slant to produce a miter joint, means for securing said strips together comprising a locking member of spring material embodying companion vertically depending legs arranged to extend approximately parallel to one another prior to insertion, each of said strips being provided with a single bore lying adjacent the engaging edges of said strip, and each bore being arranged to receive one leg of said locking member, said bores diverging from one another from their upper toward their lower ends, said bores being spaced apart at their upper ends a distance approximately equal to the distance which said legs are spaced apart, and formed of a diameter approximately equal to the diameter of the legs and of uniform diameter from end to end, said locking member when inserted having its lower ends spread apart by the relative position of the bores, whereby a spring pressure is created in said locking member forcing the strips together and holding the locking member in place, substantially as described.

WILLIAM GOODROW.

Witnesses:
EPHRAIM BANNING,
FRANCES M. FROST.